No. 837,071. PATENTED NOV. 27, 1906.
J. P. JOHNSON.
ATTACHMENT FOR MOWING MACHINES.
APPLICATION FILED NOV. 13, 1905.
Fig. 1.
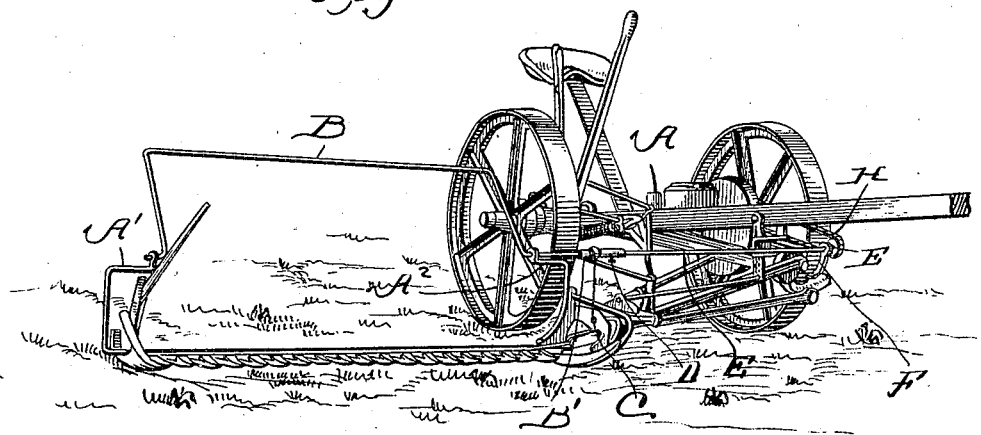
Fig. 2.
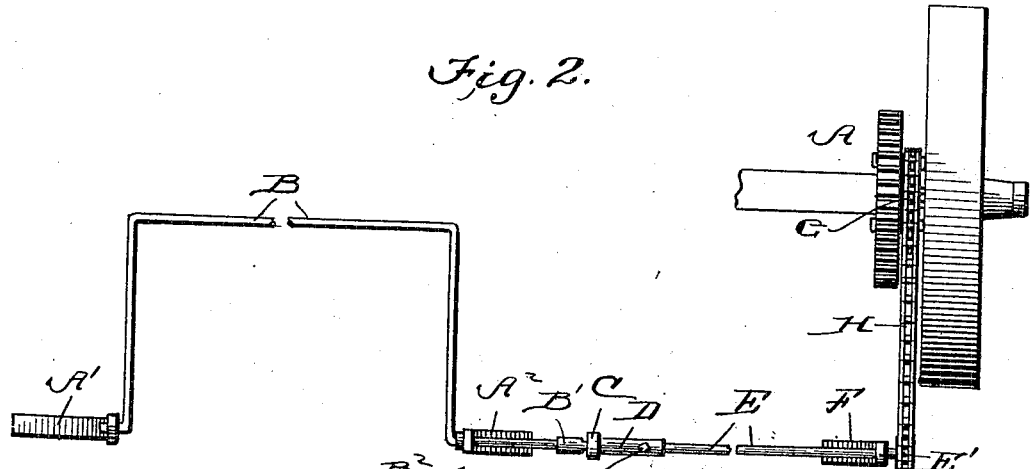
Fig. 3.
Fig. 4. Fig. 6. Fig. 7. Fig. 5.
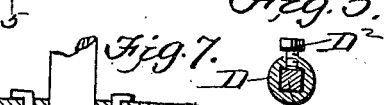
WITNESSES:
M. D. Bloudel
Rea R. Wright
INVENTOR
J. P. Johnson,
BY
Onward Brock
ATTORNEYS

UNITED STATES PATENT OFFICE.

JOHN P. JOHNSON, OF INTERIOR, SOUTH DAKOTA.

ATTACHMENT FOR MOWING-MACHINES.

No. 837,071.   Specification of Letters Patent.   Patented Nov. 27, 1906.

Application filed November 13, 1905. Serial No. 287,083.

*To all whom it may concern:*

Be it known that I, JOHN P. JOHNSON, a citizen of the United States, residing at Interior, in the county of Stanley and State of South Dakota, have invented a new and useful Attachment for Mowing-Machines, of which the following is a specification.

My invention relates to certain new and useful improvements in mowing-machines, and has for its object to provide an attachment that can be easily and quickly attached to any mowing-machine and one that will enable the mower to cut very short grass.

Another object of my invention is to provide an attachment for mowing-machines that will prevent the cutters from becoming clogged by the grass falling back in the cutters when the wind is blowing.

With these objects in view the invention consists of the novel features of construction, combination, and arrangement of parts hereinafter fully described, and pointed out in the claims.

In the drawings forming a part of this specification, Figure 1 is a perspective view of a mower, showing the reel in place. Fig. 2 is a plan view of the reel and driving-gear. Fig. 3 is an enlarged section of the shaft-coupling. Fig. 4 is a section taken on the line 4 4 of Fig. 3. Fig. 5 is a section taken on the line 5 5 of Fig. 3. Fig. 6 is a side of the sectional gear-wheel, and Fig. 7 is a section showing the manner of attaching the section-gear to the drive-gear.

Referring to the drawings, A indicates the ordinary mowing-machine, provided with the usual sickle mounted on shoes. To the outside shoe is secured a bracket A', and to the inside shoe is secured a corresponding bracket $A^2$. Journaled in these brackets is a U-shaped frame forming a reel B, one end of which is slidably mounted in the bracket $A^2$ and extends inwardly, having a screw-threaded end provided with a cap B', having arms $B^2$ extending therefrom provided with perforations in which the pins C' of the sleeve C are adapted to fit. The sleeve C is also provided with a pin $C^2$ at right angles to the pins C' and upn which the perforated arms D' of the socket D are mounted. The socket D is provided with a square opening having a set-screw $D^2$ leading into it adapted to engage the square end of the shaft E when in place. The flexible coupling formed thereby is in alinement with the hinge of the sickle, so that they can be raised together. The shaft E is journaled in a bracket F, carried by the frame of the machine, and is provided with a gear-wheel E' at its end.

To the drive-gear wheel secured on the axle of the mower I secure a sectional gear-wheel G, clamped on the axle by the bolts G' and secured to the drive-gear by the bolts $G^2$. This sectional gear carries a train H, which passes on the gear-wheel E' and operates the reel.

From the foregoing description it will be seen that I have provided a reel that can be easily and quickly attached to the ordinary mowing-machine that will enable the mower to cut short grass with the greatest of ease.

It will be also understood that I have connected the reel to the drive-shaft by a flexible coupling, so that the sickle can be raised as desired, as the reel B will slide in the bracket $A^2$.

Having thus fully described my invention, what I claim as new, and desire to secure by Letters Patent, is—

1. In a device of the kind described, the combination with a sickle for mowing-machines, bowed brackets secured to the shoes of the sickle provided with openings at their upper ends, of a reel mounted in said openings of the brackets, a cap secured on one end of the reel provided with perforated arms, a sleeve provided with pins fitting in said perforations, a socket provided with perforated arms, mounted on a pin in said sleeve, and a driving-shaft mounted in said socket, for the purpose described.

2. In a device of the kind described, the combination with a sickle for mowing-machines, having bowed brackets secured to the shoes, of a reel mounted in said brackets, a bracket mounted on the frame of the mower, a shaft mounted in said bracket, flexibly connected to the reel, a gear-wheel mounted on the shaft, a gear-wheel secured on the axle and to the drive-gear, and a chain connected to said gear-wheel for the purpose described.

3. In a device of the kind described, the combination with a sickle for mowing-machines, bowed brackets secured to the shoes of the sickle provided with openings at their upper ends, of a reel mounted in said brackets one end of the reel being screw-threaded, a cap screwed thereon, having outwardly-extending arms provided with openings, a sleeve arranged over said cap provided with pins adapted to fit in the opening of said arm, a pin extending through said sleeve, at right angles to the said pins, a socket provided with apertured arms mounted on said pin, the shaft secured in said socket provided with a gear-wheel at its end, said shaft being mounted in a bracket carried by the mower, a gear-wheel arranged on the axle of the mower, and a chain passing over said gear-wheel and the gear-wheel of the shaft, for the purpose described.

JOHN P. JOHNSON.

Witnesses:
CHAS. L. HERLEY,
JOHN G. TRIMBLE.